United States Patent
Takahashi et al.

(10) Patent No.: US 8,319,493 B2
(45) Date of Patent: * Nov. 27, 2012

(54) ROTATION DETECTING DEVICE AND BEARING ASSEMBLY EQUIPPED WITH SUCH ROTATION DETECTING DEVICE

(75) Inventors: Toru Takahashi, Iwata (JP); Shintarou Ueno, Iwata (JP); Pascal Desbiolles, Thorens-Glières (FR)

(73) Assignee: NTN Corporation, Osaka (JP)

( * ) Notice: Subject to any disclaimer, the term of this patent is extended or adjusted under 35 U.S.C. 154(b) by 336 days.

This patent is subject to a terminal disclaimer.

(21) Appl. No.: 12/733,890

(22) PCT Filed: Sep. 24, 2008

(86) PCT No.: PCT/JP2008/002631
§ 371 (c)(1),
(2), (4) Date: Mar. 25, 2010

(87) PCT Pub. No.: WO2009/041023
PCT Pub. Date: Apr. 2, 2009

(65) Prior Publication Data
US 2010/0225309 A1    Sep. 9, 2010

(30) Foreign Application Priority Data
Sep. 27, 2007    (JP) .................. 2007-250443

(51) Int. Cl.
*G01B 7/30*    (2006.01)
(52) U.S. Cl. ............................................... 324/207.25
(58) Field of Classification Search .................. None
See application file for complete search history.

(56) References Cited

U.S. PATENT DOCUMENTS

| | | | |
|---|---|---|---|
| 5,930,905 | A | 8/1999 | Zabler et al. |
| 6,384,752 | B1 | 5/2002 | Suzuki et al. |
| 6,700,367 | B1 | 3/2004 | Santos et al. |
| 7,501,812 | B2 | 3/2009 | Koike et al. |
| 7,923,993 | B2 * | 4/2011 | Takahashi et al. ....... 324/207.25 |
| 2003/0173956 | A1 | 1/2003 | Fujikawa et al. |
| 2003/0192386 | A1 | 10/2003 | Tokumoto et al. |

(Continued)

FOREIGN PATENT DOCUMENTS
JP    6-58766    3/1994
(Continued)

OTHER PUBLICATIONS
Japanese Office Action issued Oct. 4, 2011 in corresponding Japanese Patent Application 2007-260722.
(Continued)

*Primary Examiner* — Vinh Nguyen

(57) ABSTRACT

A rotation detecting device includes a plurality of magnetic encoders disposed coaxially and having respective numbers of magnetic poles different from each other and a plurality of magnetic sensors for detecting respective magnetic fields emanating from those magnetic encoders. Each of the magnetic sensors is in a ring form and obtains the position information within the magnetic poles of the associated magnetic encoder. A phase difference detector determines the difference in phase between magnetic field signals detected respectively by the magnetic sensors. An angle calculator is provided, which is operable on the basis of the difference in phase so detected to calculate an absolute angle of each of the magnetic encoders. A corrector corrects the initial phase difference occurring in the magnetic field signals, detected respectively by the magnetic sensors, as a result of the fitting position of the magnetic encoders.

9 Claims, 9 Drawing Sheets

U.S. PATENT DOCUMENTS

| | | |
|---|---|---|
| 2004/0061459 A1 | 4/2004 | Desbiolles et al. |
| 2004/0239311 A1 | 12/2004 | Santos et al. |
| 2006/0250128 A1 | 11/2006 | Tahara et al. |
| 2009/0058400 A1 | 3/2009 | Isobe et al. |
| 2009/0315544 A1 | 12/2009 | Takahashi et al. |

FOREIGN PATENT DOCUMENTS

| | | |
|---|---|---|
| JP | 2002-340918 | 11/2002 |
| JP | 2002-541485 | 12/2002 |
| JP | 2004-245642 | 9/2004 |
| JP | 2004/271503 | 9/2004 |
| JP | 2004-294145 | 10/2004 |
| JP | 3792178 | 4/2006 |
| JP | 3792718 | 4/2006 |
| JP | 2006-322927 | 11/2006 |
| JP | 2006-525518 | 11/2006 |
| WO | 00/05553 | 2/2000 |
| WO | 2004/099726 A2 | 11/2004 |

OTHER PUBLICATIONS

Japanese Notification of Reason(s) for Rejection mailed Mar. 6, 2012 issued in corresponding Japanese Patent Application No. 2007-250443.

U.S. Appl. No. 12/461,733, filed Aug. 21, 2009, Takahashi et al., NTN Corporation.

International Search Report for PCT/JP2008/002631, mailed on Nov. 18, 2008.

U.S. Office Action mailed Sep. 9, 2010 in related U.S. Appl. No. 12/461,733.

English Translation of the International Preliminary Report on Patentability mailed Apr. 15, 2010 and issued in corresponding International Patent Application PCT/JP2008/002631.

* cited by examiner

90 DEGREES

ROTATION DETECTING DEVICE AND BEARING ASSEMBLY EQUIPPED WITH SUCH ROTATION DETECTING DEVICE

CROSS REFERENCE TO RELATED APPLICATIONS

This application claims the benefit under 35 U.S.C. Section 371, of PCT International Application No. PCT/JP2008/002631, filed Sep. 24, 2008, which claimed priority to Japanese patent application No. 2007-250443, filed Sep. 27, 2007, the entire disclosures of which are herein incorporated by reference as a part of this application.

FIELD OF THE INVENTION

The present invention relates to a rotation detecting device that is used in various machines and equipments for detecting the angle of rotation, and in particular for detecting the angle of rotation for the purpose of controlling the rotation of various motors, and also to a rotation detector equipped bearing assembly having such rotation detection device mounted thereon.

BACKGROUND ART

A rotation detection device of this kind has been suggested, which includes a ring-shaped magnetic pulse generating means such as, for example, a magnetic encoder having magnetic pole pairs in a direction circumferentially thereof and for generating magnetic pulses, and a plurality of detecting elements for detecting the magnetic pulses, substantially aligned in a direction circumferentially thereof and associated with the magnetic pulse generating means and is so designed that the absolute angle can be detected by calculating the respective output signals generated from the detecting elements. (See, for example, the Patent Document 1 listed below.).

Also, as a different rotation detecting device, the rotation detecting device has been suggested (in, for example, the Patent Document 2 listed below), in which respective angles of rotation of two auxiliary gears are utilized to calculate the absolute angle of a main shaft.

[Patent Document 1] JP Published Int'l Application No. 2002-541485
[Patent Document 2] JP Patent No. 3792718

It has, however, been found that in the case of the rotation detecting device disclosed in the Patent Document 1 listed above, it is difficult to detect the absolute angle with the use of the magnetic encoder and to secure a rotation pulse of a high resolution.

Also, in the case of the rotation detecting device disclosed in the Patent Document 2 listed above, the structure is complicated and cannot therefore be manufactured in a compact size.

The inventors of the present invention have suggested the rotation detecting device capable of detecting the absolute angle with high precision, which is of the following structure.

In this rotation detection device, the use is made of a plurality of magnetic encoders of a ring shape arranged coaxially and having different numbers of magnetic poles, a plurality of magnetic sensors each operable to detect the magnetic field of the corresponding magnetic encoder and having a function of detecting positional information within a single magnetic pole of the corresponding magnetic encoder, a phase difference detector for determining the phase difference of magnetic field signals detected respectively by the magnetic sensors, and an angle calculator for calculating an absolute rotation angle of the magnetic encoders based on the detected phase difference.

In the case of the rotation detecting device of the structure described above, if rotation is made using a magnetic encoder having 12 magnetic pole pairs, and a magnetic encoder having 13 magnetic pole pairs is 13, the phase difference corresponding to one magnetic pole pair for each complete rotation occurs between the two magnetic sensors used to detect those magnetic fields. Accordingly, by detecting such phase difference with the phase difference detector and by using the angle calculator based on such phase difference, the absolute angle during one complete rotation can be calculated. Also, since each of the magnetic sensors has a function of detecting information on a position of the respective magnetic encoder within a single magnetic pole, the absolute angle can be detected with high precision. Also, the construction can be simplified.

However, in the case of the rotation detecting device of the structure described above, if the position at which the magnetic encoders are fitted deviates, the absolute angle cannot be detected with high precision.

SUMMARY OF THE INVENTION

An object of the present invention is to provide a rotation detecting device simple in structure and capable of detecting the absolute angle with high precision without being affected by the position at which the magnetic encoder is fitted, and, also, a rotation detector equipped wheel support bearing assembly having this rotation detecting device mounted thereon.

The rotation detecting device of the present invention is a rotation detecting device, which includes a plurality of magnetic encoders of a ring shape arranged coaxially and having different numbers of magnetic poles; a plurality of magnetic sensors each operable to detect the magnetic field of the corresponding magnetic encoder and having a function of detecting positional information within a single magnetic pole of the corresponding magnetic encoder; a phase difference detector for determining the phase difference of magnetic field signals detected respectively by the magnetic sensors; an angle calculator for calculating an absolute rotation angle of the magnetic encoders based on the detected phase difference; and a correcting unit for correcting an initial phase difference occurring in the magnetic field signals, detected respectively by the magnetic sensors, due to positions at which the magnetic encoders are fitted.

By way of example, if rotation is made using a magnetic encoder having 12 magnetic pole pairs, and a magnetic encoder having 13 magnetic pole pairs is 13, the phase difference corresponding to one magnetic pole pair for each complete rotation occurs between the two magnetic sensors used to detect those magnetic fields. Accordingly, by detecting such phase difference with the phase difference detector and by using the angle calculator based on such phase difference, the absolute angle during one complete rotation can be calculated. Also, since each of the magnetic sensors has a function of detecting information on a position of the respective magnetic encoder within a single magnetic pole, the absolute angle can be detected with high precision. Also, the construction can be simplified. Moreover, since the initial phase difference resulting from the position, at which the magnetic encoder is fitted, and occurring in the magnetic field signal, detected by the magnetic sensor is corrected by the correcting unit, the absolute angle can be detected with high precision without being affected by the position at which the magnetic encoder is fitted.

In the present invention, as the correcting unit referred to above, as the correcting unit, one correcting unit for correcting the initial phase difference of the magnetic field signal detected by one of the magnetic sensors may be provided. If the number of the correcting unit is one, the structure can be simple. It is to be noted that in this case, the initial phase difference between the magnetic signals detected by the plurality of the magnetic sensors is rendered to be a correction value.

In the present invention, as the correcting unit, a plurality of correcting unit for correcting the initial phase differences of the magnetic field signals detected respectively by the magnetic sensors may be provided. In this case, the initial phase difference of, for example, the magnetic signals, detected by the magnetic sensors, relative to a reference phase is rendered to be a correction value. In the case of this construction, setting is possible by aligning the phase signal freely with zero at any arbitrary chosen position of a rotating body. As a result, it is possible to store the arbitrarily chosen rotational position as the reference position and alignment in position with a mechanical body after the fitting of the sensor can be accomplished simply.

The rotation detecting device of the present invention further may include a storage unit for storing a predetermined value of an initial phase difference which value is arbitrarily adjustable from outside, and the correcting unit may be supplied with the predetermined value. The term "outside" referred to above and hereinafter is intended to mean, for example, the outside relative to this rotation detecting device. In the case of this construction, it is possible to cause the predetermined value of the initial phase difference to be held by the storage unit and this predetermined value can be freely adjusted when required.

In the present invention, each of the magnetic sensors may include a plurality of sensor elements arranged in offset relation relative to each other within a pitch between the neighboring magnetic poles so as to provide two phase signal output forming sine and cosine curves, relatively, and operable to detect the position within the magnetic poles by interpolation of those signal outputs.

By designing each of the magnetic sensors as hereinabove described, a distribution of magnetic fields of the respective magnetic encoder can be finely detected as a sinusoidal signal represented by an analog voltage, not as an ON-OFF signal, and therefore the highly precise absolute angle detection can be accomplished.

In the present invention, each of the magnetic sensors may include a line sensor, in which sensor elements are lined up in a direction conforming to the direction, in which the magnetic poles of the corresponding magnetic encoder are arranged and is operable to generate two phase signal outputs descriptive of sine and cosine curves by means of calculation to thereby detect the position within the magnetic poles by interpolation of the two phase signal outputs.

Where each of the magnetic sensors is employed in the form of the line sensor as hereinabove described, strain of the magnetic fields pattern and influences which may be brought about by noises can be reduced and the detection error in the multiplication circuit can be reduced. Therefore, the phase of the respective magnetic encoder can be detected with further high precision.

In the present invention, the rotation detecting device may further include an angle information output circuit operable on a basis of a detection signal from one of the magnetic sensors to output the absolute angle, calculated by the angle calculator, in the form of an ABZ phase signal comprised of two, A phase and B phase pulse signals which are displaced 90° in phase relative to each other and a Z phase pulse signal indicative of a position of origin.

In the case of this construction, no extra interface for outputting the absolute angle need be employed and, therefore, the circuit construction of this rotation detection device and the circuit construction on the side of a machine in which the rotation detection device is mounted can be simplified. Also, it is possible to output the ABZ phase signal synchronized with the information on the absolute angle.

In the present invention, the rotation detecting device may further include an angle information output circuit for outputting the absolute angle calculated by the angle calculator and wherein the magnetic sensors, the phase difference detector, the angle calculator and the angle information output circuit are integrated together into a sensor module. In the case of this construction, various advantages such as reduction in number of component parts, increase in positional precision of the magnetic sensors relative to each other, reduction in manufacturing cost, reduction in assembling cost, increase in detecting precision as a result of reduction in signal noises and so on can be obtained, rendering it to be a compact rotation detection device that is low in cost.

In the present invention, the module may be integrated on a semiconductor chip. Where it is integrated on the semiconductor chip, it can be further compactized and the reliability can increase.

The rotation detecting device equipped bearing assembly of the present invention is of a type utilizing the rotation detecting device of any of the structures described hereinabove.

According to this construction, reduction of the number of component parts used in a bearing utilizing machine, reduction of the number of assembling steps and compactization can be achieved.

In the present invention, the bearing assembly referred to above may be a wheel support bearing assembly. In the case of this construction, the angle of rotation of the vehicle wheel can be detected as the absolute angle with high precision.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
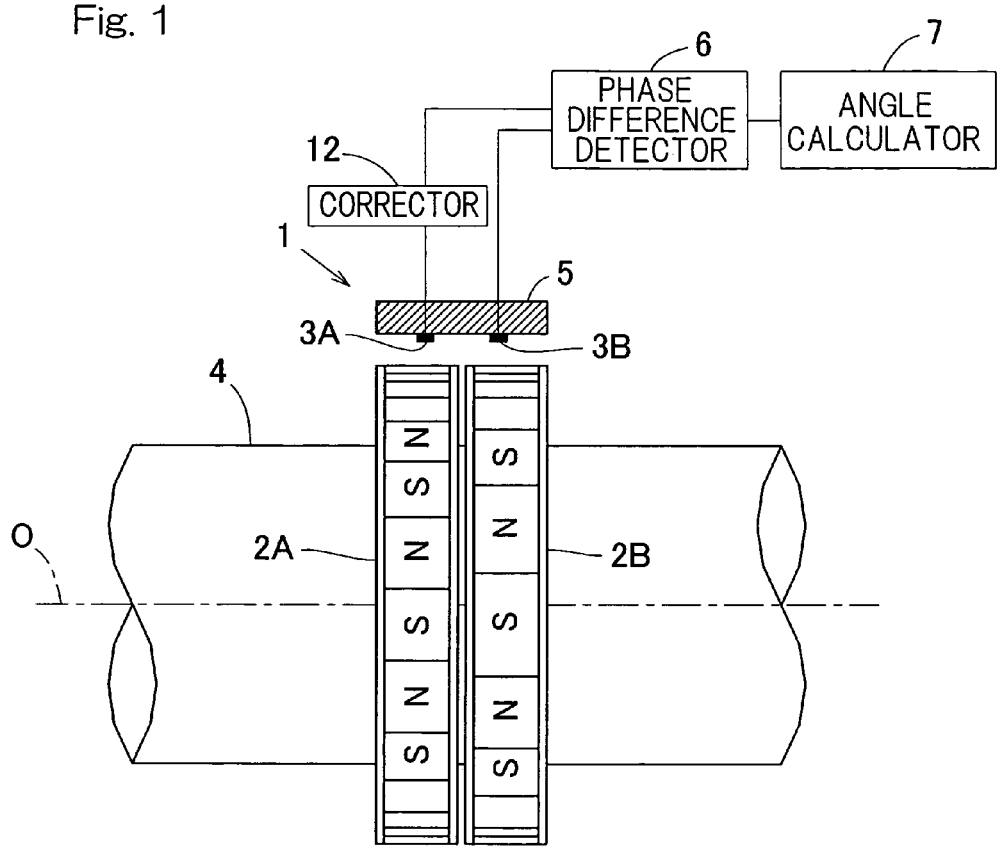
FIG. 1 is a schematic diagram showing one constructional example of a rotation detecting device according to a first preferred embodiment of the present invention.

A first preferred embodiment of the present invention will be described in detail with particular reference to FIGS. 1 to 10. FIG. 1 illustrates a schematic structure of a rotation detection device according to this embodiment. This rotation detection device 1 includes a plurality of (for example, two, in the illustrated embodiment) magnetic encoders 2A and 2B mounted on an outer periphery of a rotating member 4 such as, for example, a rotary shaft of a motor or a rotatable ring of a wheel support bearing assembly, each in a ring shape in coaxial relation with the longitudinal axis O of the rotating member 4, and a plurality of (for example, two, in the illustrated embodiment) magnetic sensors 3A and 3B for detecting respective magnetic fields emanating from the associated magnetic encoders 2A and 2B. The magnetic sensors 3A and 3B are, in the illustrated embodiment, provided at a stationary member 5 such as, for example, a housing of the motor or a stationary ring of the bearing assembly so as to be held in face-to-face relation with the associated magnetic encoders 2A and 2B in a direction radially of the latter with minute gaps intervening between the magnetic encoders 2A and 2B and the magnetic sensors 3A and 3B. In the instance now under discussion, the magnetic sensor 3A confronts the magnetic encoder 2A whereas the magnetic sensor 3B confronts the magnetic encoder 2B.

Each of the magnetic encoders 2A and 2B is in the form of a ring made of a magnetic material and having a plurality of magnetic pole pairs, one pair consisting of a south pole S and a north pole N, that are magnetized thereto at equal intervals in a direction circumferentially thereof and, in the example of FIG. 1 showing a radial type, the magnetic pole pairs are magnetized on an outer peripheral surface of the respective magnetic encoder 2A and 2B. The number of the magnetic pole pairs in one of the magnetic encoders 2A and 2B is different from that in the other of the magnetic encoders 2A and 2B. Also, although in the example shown in FIG. 1, the two magnetic encoders 2A and 2B are closely juxtaposed relative to each other in the axial direction of the rotatable member 4, they may be positioned at separate locations away from each other, provided that those magnetic encoders 2A and 2B can rotate in unison with each other.

Figure 2:
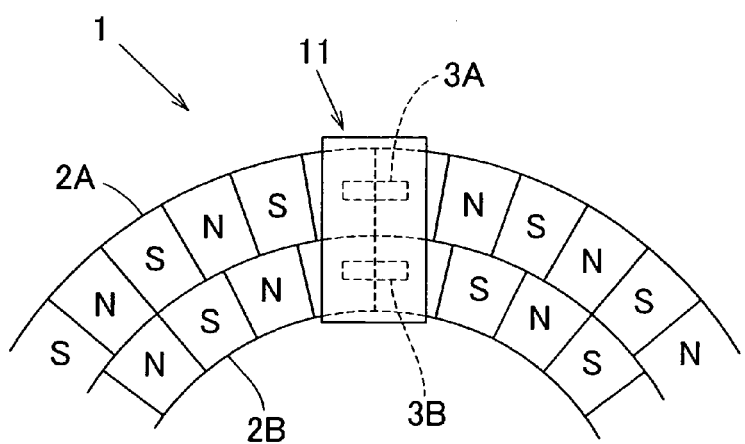
FIG. 2 is a side view of an important portion showing another constructional example of the rotation detecting device.

As another example of the magnetic encoders 2A and 2B, an axial type may be employed, in which as best shown in FIG. 2, a plurality of magnetic pole pairs are arranged on respective axial end faces of rings, each made of a magnetic material, at equal intervals in the direction circumferentially thereof. In this example, the two magnetic encoders 2A and 2B are so positioned one inside the other with inner and outer peripheral faces of those magnetic encoders 2A and 2B confronting or held in contact with each other. In the case of the magnetic encoders 2A and 2B of the axial type, the magnetic sensors 3A and 3B are so positioned as to axially confront respective magnetized surfaces of the magnetic encoders 2A and 2B.

Figure 3:
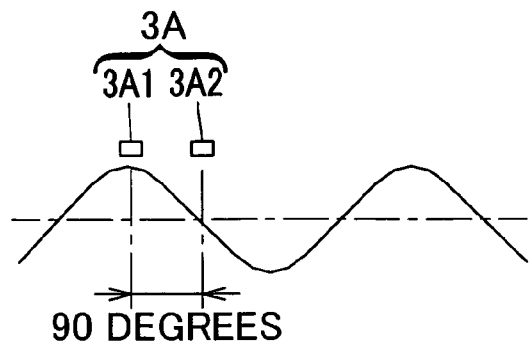
FIG. 3 is an explanatory diagram showing a constructional example of a magnetic sensor.

Each of the magnetic sensors 3A and 3B is designed to have a function of detecting the magnetic poles with a finer resolution than the number of the magnetic pole pairs of the respective magnetic encoder 2A and 2B, that is, a function of acquiring information on a position or rotational information within a single magnetic pole of each of the magnetic encoder 2A and 2B. In order to implement this function, using the magnetic sensor 3A, for example, two magnetic sensor elements 3A1 and 3A2 such as, for example, when the pitch X of one of the magnetic pole pairs of the associated magnetic encoder 2A is assumed to be equal to one period or one cycle, two Hall elements are so arranged and so spaced in a direction of arrangement of magnetic poles as to be spaced 90° in phase from each other as shown in FIG. 3. The phase within a single magnetic pole ($\Phi = \tan^{-1}(\sin \Phi/\cos \Phi)$) may be calculated based on two phase signals ($\sin \Phi$ and $\cos \Phi$)) obtained from those two magnetic sensor elements 3A1 and 3A2 by means of respective interpolation circuits built in those magnetic sensor elements 3A1 and 3A2. This equally applies to the other magnetic sensor 3B. It is to be noted that the waveform shown in FIG. 3 represents the arrangement of the magnetic poles of the magnetic encoder 2A in terms of the magnetic field strengths emanating therefrom.

When the magnetic sensors 3A and 3B are so constructed as hereinabove described, respective distributions of magnetic fields emanating from the magnetic encoders 2A and 2B can be finely detected as a sinusoidal signal with an analog voltage, not as an On/Off signal, thereby making it possible to achieve an accurate detection of the absolute angle.

Figure 4A:
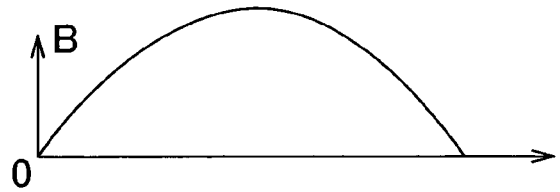
FIGS. 4A to 4C are explanatory diagrams showing a different constructional example of the magnetic sensor.
Figure 4B:
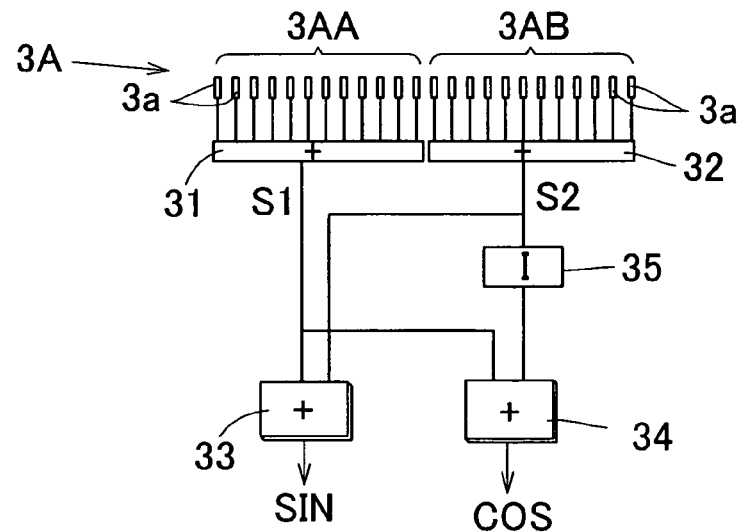
Figure 4C:
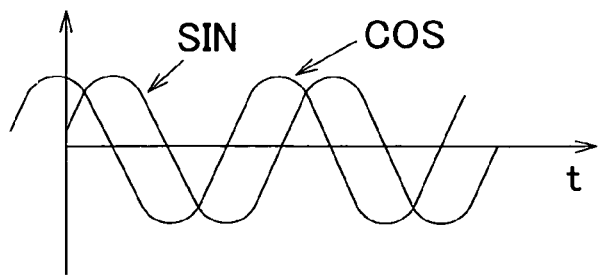

As another example of each of the magnetic sensors 3A and 3B having a function of acquiring information on a position within one of the magnetic poles of the corresponding magnetic encoder 2A and 2B, such a line sensor as shown in FIG. 4B may be employed. In other words, for the magnetic sensor 3A, for example, line sensors 3AA and 3AB may be employed, in which magnetic sensor elements 3a are lined up in a direction of arrangement of the magnetic poles of the corresponding magnetic encoder 2A. It is to be noted that FIG. 4A illustrates a waveform of the interval of one magnetic pole in the magnetic encoder 2A as converted into the magnetic field strength. In such case, the first line sensor 3AA of the magnetic sensor 3A is disposed in a 90° phase sub-sector of the 180° phase sector whereas the second line sensor 3AB is disposed in the remaining 90° phase sub-sector. With the above described arrangement, by further summing a signal S1, which is a summation of detection signals of the first line sensor 3AA performed by an adder circuit 31, and a signal S2, which is a summation of detection signals of the second line sensor 3BB performed by another adder circuit 32, together by still another adder circuit 33, a sine signal based on the magnetic field signal, as shown in FIG. 4C, can be obtained. Also, by summing the signal S1 and the signal S2 that is fed through an inverter 35, together by a further adder circuit 34, a cosine signal based on the magnetic field signal, as shown in FIG. 4C, can be obtained. From those two phase output signals obtained in this way, a position within one of the magnetic poles can be detected by means of interpolation.

Where each of the magnetic sensors 3A and 3B is so constructed as hereinabove described, influences such as, for example, noises and/or strains of the magnetic field pattern can be reduced and the phase of the respective magnetic encoder 2A and 2B can be detected with high precision.

For example, in the example of construction shown in FIG. 1, the magnetic sensors 3A and 3B are connected to a phase difference detector 6. The phase difference detector 6 determines the difference in phase between the magnetic field signals detected respectively by the magnetic sensors 3A and 3B, and an angle calculator 7 is connected downstream of the phase difference detector 6. The angle calculator 7 calculates the absolute angle of the magnetic encoders 2A and 2B based on the phase difference detected by the phase difference detector 6.

In the constructional example shown in FIG. 1, the corrector 12 interposed between the magnetic sensor 3A and the phase difference detector 6 is a means for correcting the initial phase difference occurring in the magnetic signal detected by the magnetic sensor 3A due to the position at which the corresponding magnetic encoder 2A is fitted, and the magnetic field signal corrected by this corrector 12 is inputted to the phase difference detector 6.

An operation of the rotation detection device 1 of the structure described above to detect the absolute angle will now be described in outline with particular reference to FIGS. 5 to 7. Assuming that in FIG. 1 the respective numbers of the pair of the magnetic poles that the two magnetic encoders 2B and 2A have are expressed by P and P+n, the phase difference between the magnetic encoders 2A and 2B per rotation will be n number of the phase for a single magnetic pole pair and, therefore, phases of the respective detection signals of the magnetic sensors 3A and 3B associated with the magnetic encoders 2A and 2B match with each other for each 360/n degree rotation.

Figure 5:
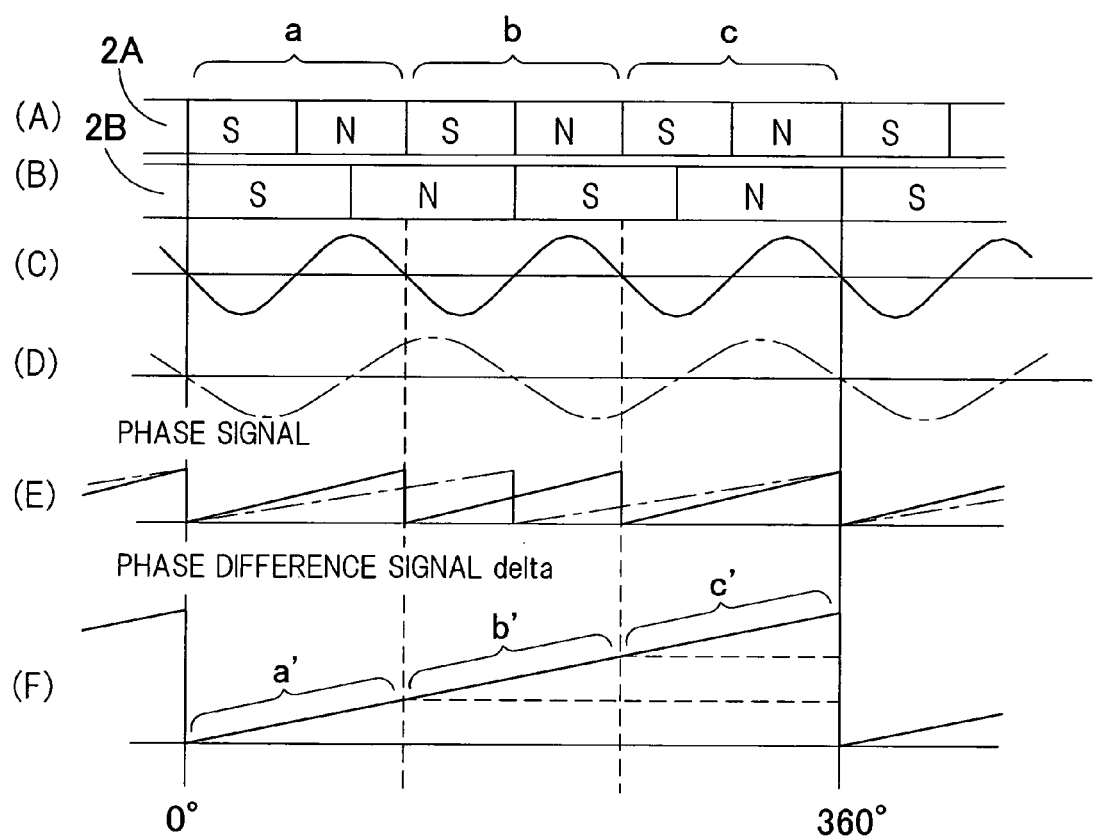
FIG. 5 is a diagram showing respective waveforms of a detection signal, a phase signal and a phase difference signal during the absence of an initial phase difference in the detection signal of the magnetic sensor.

Examples of the respective patterns of the magnetic poles of the magnetic encoders 2A and 2B are shown in (A) and (B) of FIG. 5, respectively, and waveforms of the respective detection signals of the magnetic sensors 3A and 3B corresponding to those magnetic encoders are shown in (C) and (D) of FIG. 5. In this case, two magnetic pole pairs of the magnetic encoder 2B correspond to three magnetic pairs of the magnetic encoder 2A and the absolute position within the range covered by these magnetic poles can be detected. More specifically, since in this example, the respective numbers of the pair of the magnetic poles that the two magnetic encoders 2B and 2A have are 2 and 3, the phase difference between the magnetic encoders 2A and 2B per rotation is 1 number of the phase for a single magnetic pole pair and, therefore, phases of the respective detection signals of the magnetic sensors 3A and 3B associated with the magnetic encoders 2A and 2B match with each other for each 360/n degree rotation.

FIG. 5(E) is a diagram showing the waveforms of detection phases of the magnetic sensors 3A and 3B. More specifically, the waveform shown by the solid line in (E) of FIG. 5 represents the phase signal corresponding to the detection signal of the magnetic sensor 3A shown in (C) of FIG. 5 and the waveform shown by the single-dotted line represents the phase signal corresponding to the detection signal of the magnetic sensor 3B shown in (D) of FIG. 5. A diagram showing the waveform of the phase difference signal delta that can be determined by the phase difference detector 6 shown in FIG. 1 on the basis of the phase signal shown in (E) of FIG. 5 is shown in (F) of FIG. 5.

It is to be noted that in FIG. 5, there is shown an example in which no initial phase difference Φ resulting from the positions, at which the magnetic encoders 2A and 2B are fitted, exist (Φ=0) and the correction by the corrector 12 shown in FIG. 1 is not carried out.

The angle calculator 7 calculates approximate phases a', b' and c' of one magnetic encoder (the magnetic encoder 2A having a large number of magnetic pole pairs in the instance now under discussion), from the phase difference signal delta shown in (F) of FIG. 5 and detected by the phase difference detector 6 and then determines the detection positions a, b and c of each of the magnetic pole pairs of the magnetic encoder 2A. In such case, since there is no initial phase difference Φ (Φ=0) of the magnetic encoders 2A and 2B, a=a', b=b' and c=c' and, hence, the absolute angle can be calculated with high precision.

Figure 6:
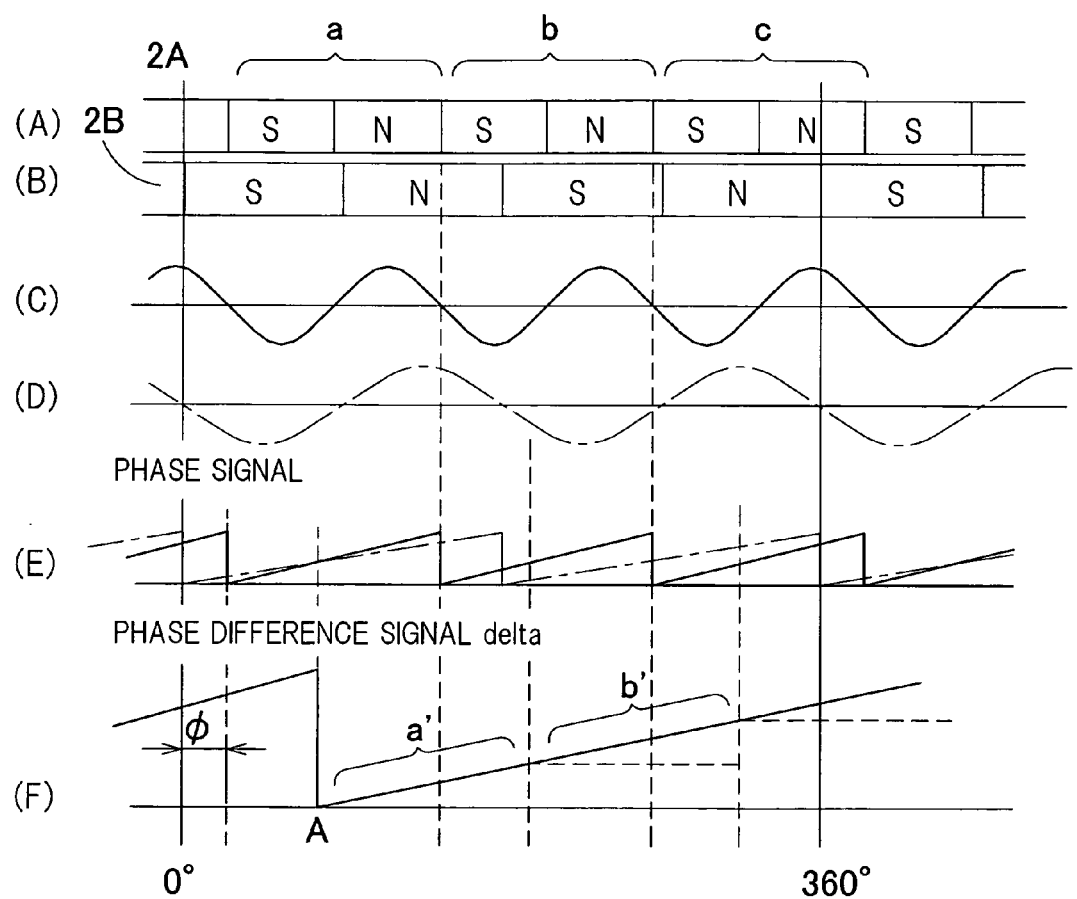
FIG. 6 is a diagram showing respective waveforms of the detection signal, the phase signal and the phase difference signal during the presence of the initial phase difference in the detection signal of the magnetic sensor.

FIG. 6 illustrates waveforms similar to those shown in FIG. 5, respectively, which appear when the initial phase difference Φ resulting from the positions, at which the magnetic encoders 2A and 2B are fitted, exists and no correction is carried out by the corrector 12. In such case, since the initial phase difference Φ exists in the magnetic encoders 2A and 2B, a deviation occurs in the phase signal corresponding to the magnetic encoder 2A and, hence, a deviation occurs in the phase difference signal delta so obtained. That is, assuming that the respective phase signals corresponding to, for example, the two magnetic encoders 2A and 2B are designated by θ1 and θ2, the phase difference signal delta so obtained can be expressed as follows:

delta=(θ1+Φ)−θ2

Therefore, as shown in (F) of FIG. 6, the phase difference signal delta shifts from 0°, at which it assumes zero, to a point A. As a result, when the angle calculator 7 calculates the approximate phases a', b' and c' of the magnetic encoder 2A from this phase difference signal delta, the approximate phases a', b' and c' so calculated do not match with the actual detection positions a, b and c of the magnetic encoder 2A and, therefore, the absolute angle cannot be calculated with high precision.

Figure 7:
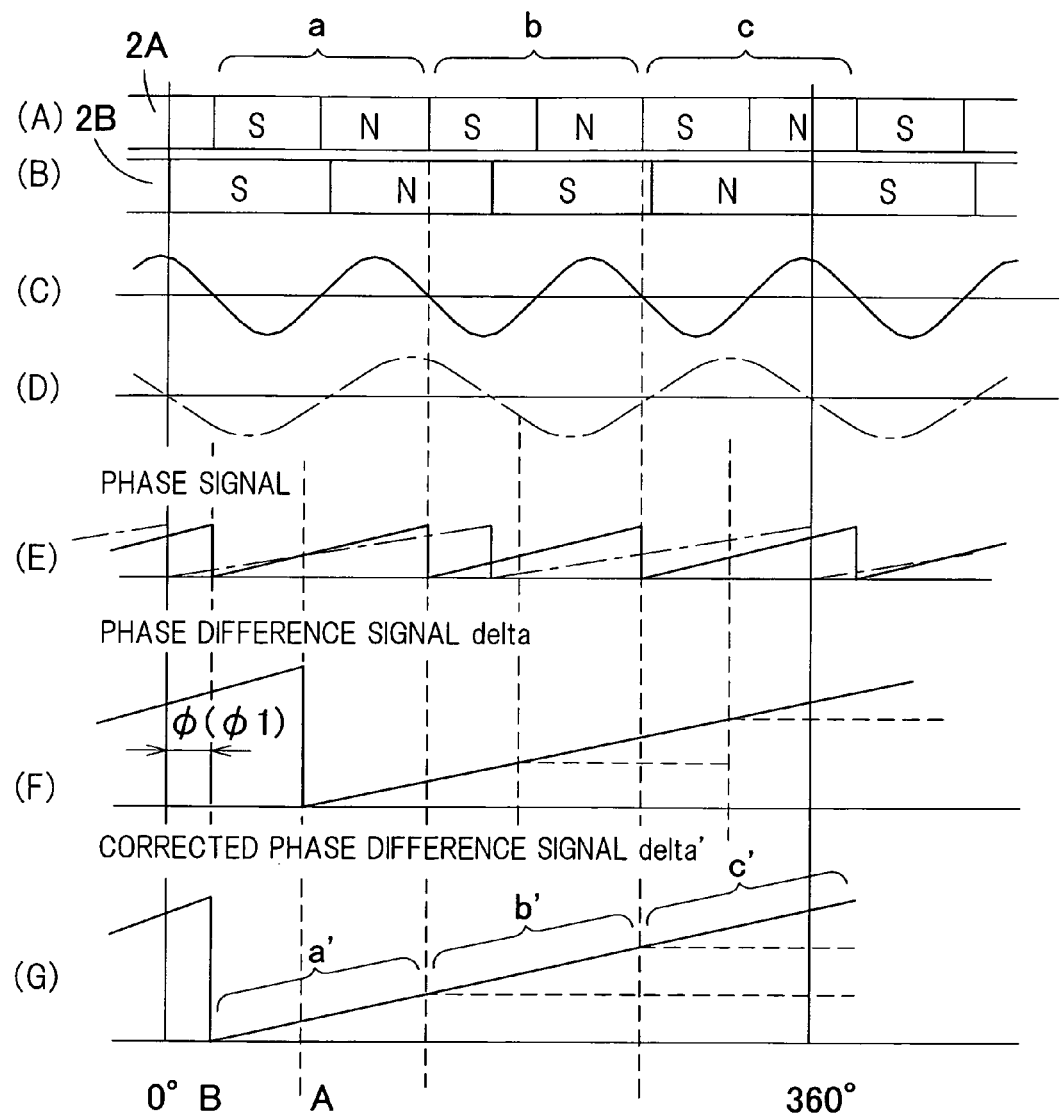
FIG. 7 is a diagram showing respective waveforms of the detection signal, the phase signal and the phase difference signal when the initial phase difference of the detection signal of the magnetic sensor has been corrected.

FIG. 7 illustrates waveforms similar to those shown in FIG. 5, respectively, which appear when the initial phase difference Φ resulting from the positions, at which the magnetic encoders 2A and 2B are fitted, exists (Φ≠0) and the correction is carried out by the corrector 12. In this case, the phase difference signal delta, shown in (F) of FIG. 7 and obtained when no correction is carried out, is corrected as shown in (G) of FIG. 7. That is to say, the point at which the phase difference signal delta assumes zero when not corrected, which has been shifted to the point A, is shifted to a point B as is shown by the phase difference signal delta' shown in (G) of FIG. 7. From this corrected phase difference signal delta', in a manner similar to that shown in FIG. 5, the angle calculator 7 calculates the approximate phases a', b' and c' of the magnetic encoder 2A to thereby determine the detection positions a, b and c of each of the magnetic pole pairs of the magnetic encoder 2A. In such case, since the initial phase difference Φ of the magnetic encoders 2A and 2B is corrected, a=a', b=b' and c=c' and, hence, the absolute angle can be calculated with high precision.

Figure 8:
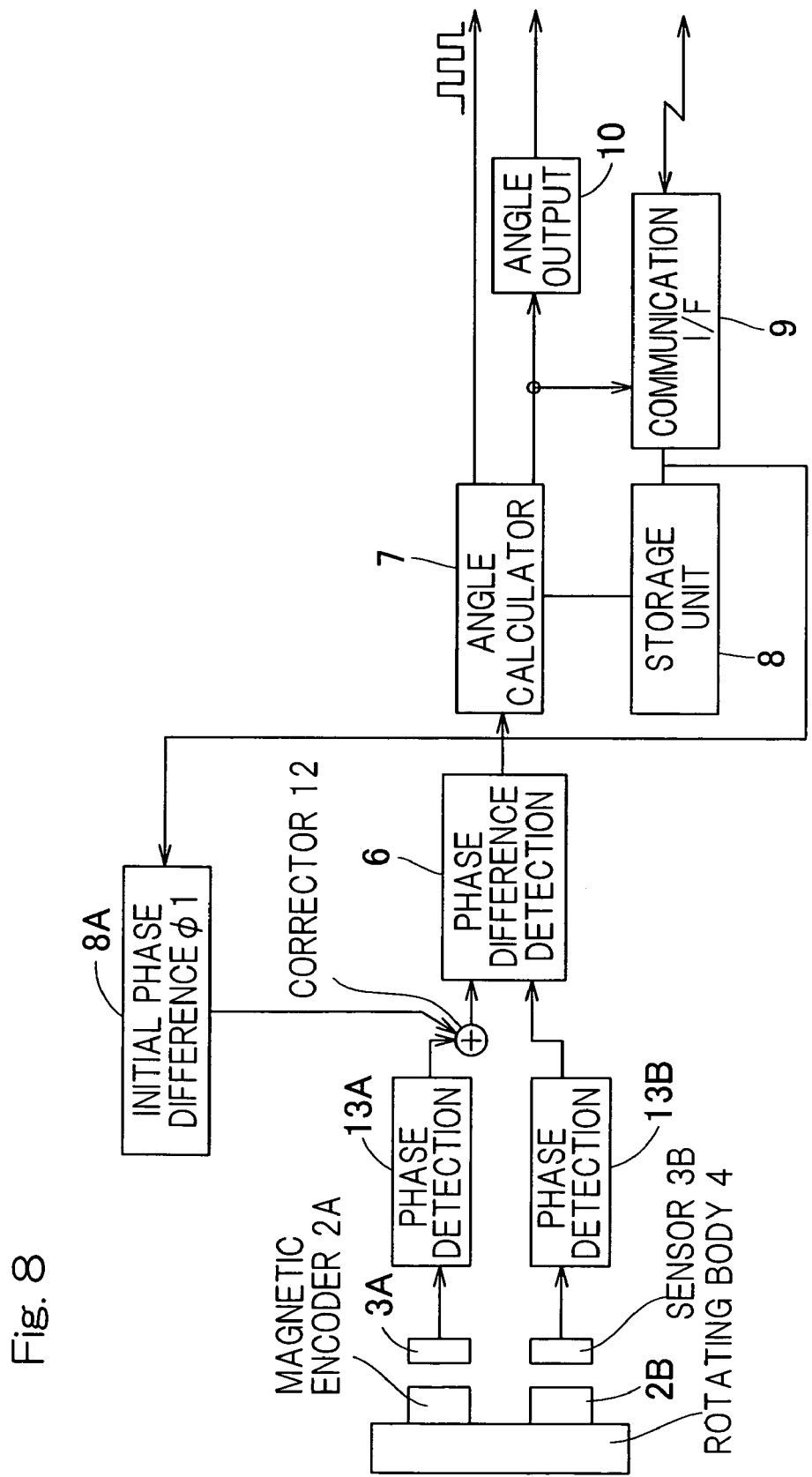
FIG. 8 is a block diagram showing one constructional example of an absolute angle detecting circuit employed in this rotation detecting device.

FIG. 8 illustrates one constructional example of the absolute angle detecting circuit employed in this rotation detecting device 1. Based on the detection signals of each of the magnetic sensors 3A and 3B as shown in (C) and (D) of FIG. 7, phase detecting circuits 13A and 13B associated respectively therewith output corresponding phase signals as shown in (E) of FIG. 7. The corrector 12 corrects the phase signal associated with the magnetic encoder 2A by a value corresponding to, for example, the initial phase difference $\Phi 1$ of the two magnetic encoders 2A and 2B. The value of the initial phase difference $\Phi 1$ is written in a storage unit 8A such as, for example, an internal register or a non-volatile memory from the outside through a communication interface 9, and the value of the initial phase difference $\Phi 1$ so written in is inputted to the corrector 12. The storage unit 8A referred to above may be limited to the structure, in which the value of the initial phase difference $\Phi 1$ is written in through the communication interface 9, but may be of a structure, in which a dedicated pin capable of setting the initial phase difference $\Phi 1$ is employed or in which it is written in a fuse ROM.

Thereby, the phase difference signal outputted from the phase difference detector 6 becomes a corrected phase difference signal delta' as shown in (G) of FIG. 7. The angle calculator 7 provided in the subsequent stage is operable to convert the phase difference, obtained from the phase difference detector 6, into the absolute angle according to a preset calculation parameter.

The calculation parameter used by the angle calculator 7 is stored in a storage unit 8 such as, for example, a nonvolatile storage unit. This storage unit 8 stores, in addition to the calculation parameter referred to above, various pieces of information required to operate the device, such as, for example, setting the numbers of the magnetic pole pairs of those magnetic encoders 2A and 2B, the absolute angle reference position and signal outputting methods. In the illustrated instance, a communication interface 9 is provided in the stage subsequent to the storage unit 8 so that the contents stored in the storage unit 8 can be updated through the communication interface 9. Accordingly, the individual setting information can be modified according to the current condition of use, thus increasing the handleability.

The absolute angle information calculated by the angle calculator 7 is outputted as a modulated signal such as, for example, PWM, an analog voltage, serial data or a parallel signal from an angle information output circuit 10 or through the communication interface 9. Also, a rotation pulse signal is also outputted from the angle information output circuit 10. For the rotation pulse signal, it is sufficient to output one of the detection signals generated respectively from the two magnetic sensors 3A and 3B. As hereinabove described, since each of the magnetic sensors 3A and 3B is equipped with a respective multiplying function, the rotation signal can be outputted with a high resolution.

The angle information output circuit 10 shown in FIG. 8 may be so designed as to output the absolute angle, calculated by the angle calculator 7, as an ABZ phase signal comprised of two pulse signals, including A and B phase signals differing 90° in phase from each other, and a pulse signal including a Z phase signal indicative of the position of origin. In such case, by electrically processing or setting the respective magnetic pole numbers of the magnetic encoders 2A and 2B so set that the difference in phase between the respective output signals of the magnetic sensors 3A and 3B matches once per rotation, one Z phase pulse signal is generated per each complete rotation of the rotatable member 4.

Figure 10:
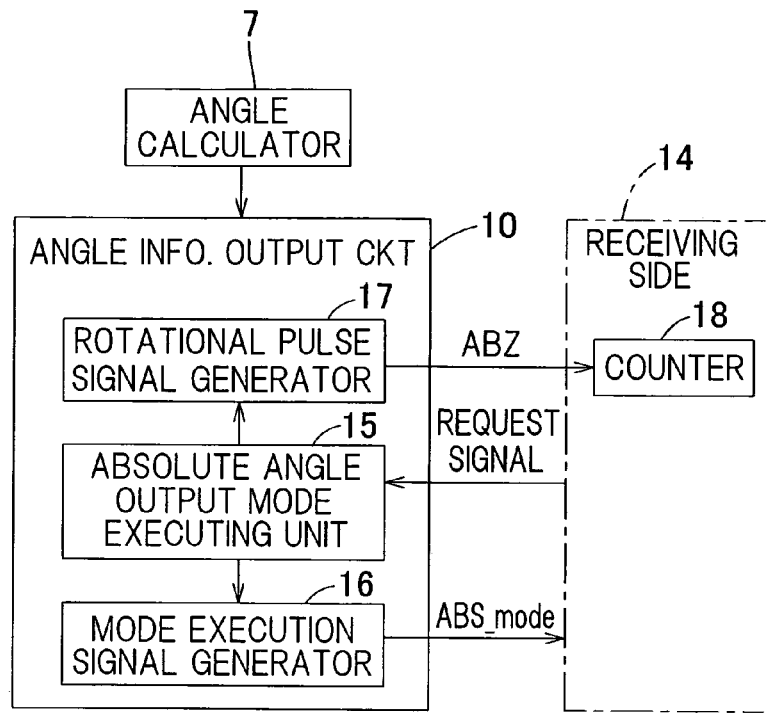
FIG. 10 is a block diagram showing one constructional example of an angle information output circuit employed in this rotation detecting device.

To output the ABZ phase signal, the angle information output circuit 10 may be so designed that, when as shown in FIG. 10, a request signal requesting the absolute angle to be outputted is supplied from a receiving side circuit 14 to the angle information output circuit 10, an absolute angle executing unit 15, included in the angle information output circuit 10, can be enabled in response to the request signal and a mode execution signal (ABS_mode=1) indicative of the absolute angle output mode taking place can be then generated from a mode execution signal generator 16 also included in the angle information output circuit 10, and A, B and Z phase signals can therefore be generated from a rotation pulse signal generator 17 also included in the angle information output circuit 10.

In the receiving side circuit 14, a position counter 18 indicative of the absolute angle value is reset to zero (0) in response to receipt of the Z phase signal and counts the A phase signal and the B phase signal that are outputted following the Z phase signal. Once pulse outputs of the A phase signal and of the B phase signal reach the current absolute angle value, the operation under the absolute angle output mode then terminates (ABS_mode=0). Thereafter, a rotation pulse signal (the ABZ phase signal) representing change in absolute angle detected as a result of rotation of the rotatable member 4 (FIG. 1) is outputted from the angle calculator 7. In this way, in the receiving side circuit 14, in which the absolute angle is ascertained by counting the pulses, a condition is established in which subsequent to termination (ABS_mode=0) of the operation under the absolute angle output mode, the actual absolute angle information is acquired at all times.

As hereinabove described, when arrangement is made so that the rotation pulse signal such as the ABZ phase signal can be outputted from the angle information output circuit 10 and the absolute angle information can be outputted during the absolute angle output mode, the circuit design of the rotation detection device 1 and the circuit design of a machine or equipment having the rotation detection device 1 incorporated therein can be simplified with no need to implement any extra interface for outputting the absolute angle.

Figure 9:
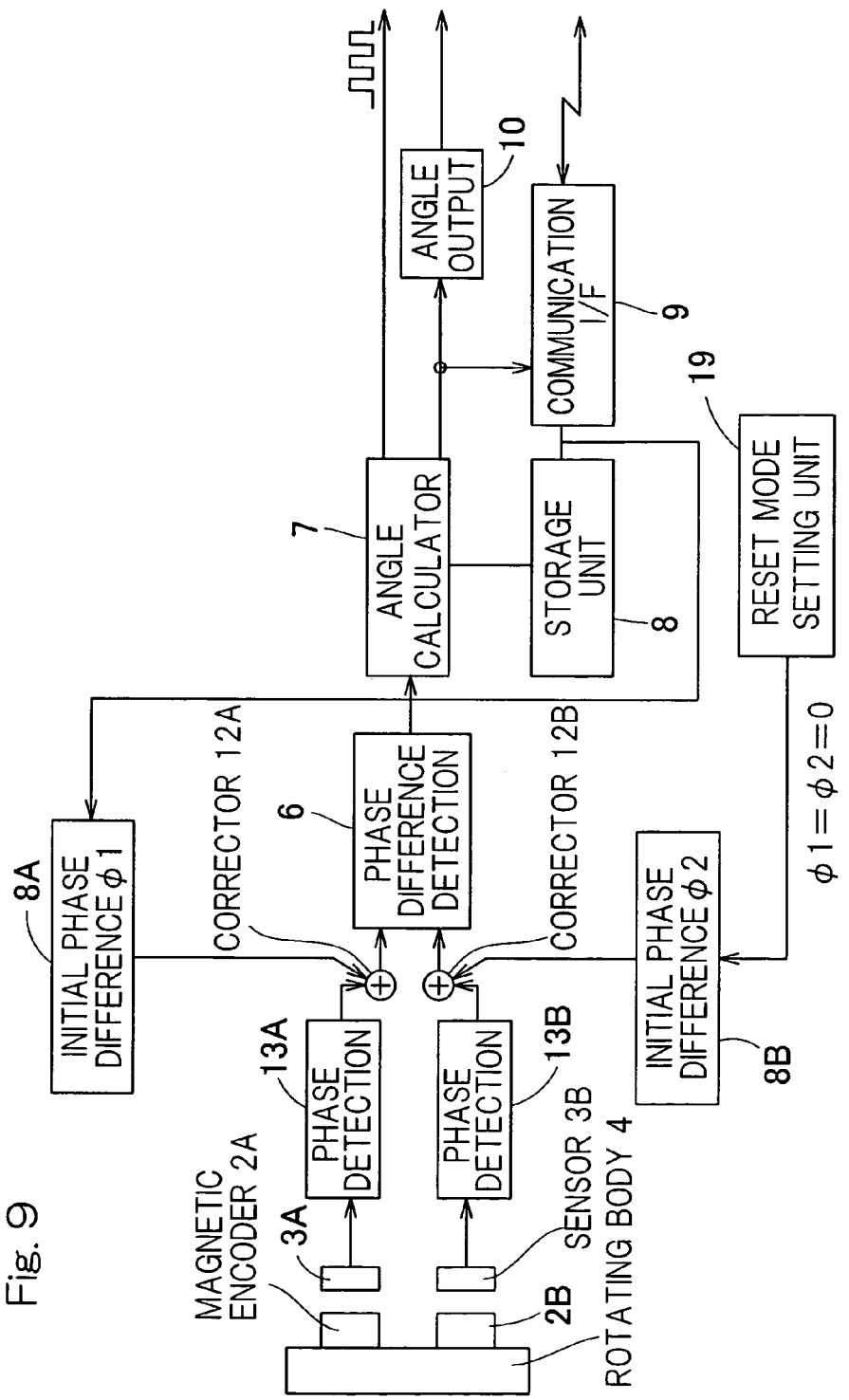
FIG. 9 is a block diagram showing another constructional example of the absolute angle detecting circuit employed in this rotation detecting device.

FIG. 9 illustrates another constructional example of the absolute angle detecting circuit employed in the rotation detecting device 1. In this constructional example, for each of the magnetic sensors 3A and 3B, a respective storage units 8A and 8B, in which the associated initial phase difference $\Phi 1$ and $\Phi 2$ are written, and a respective corrector 12A and 12B are provided in the constructional example shown in and described with reference to FIG. 8. It is to be noted that the initial phase differences $\Phi 1$ and $\Phi 2$ are phase differences relative to an arbitrarily chosen reference phase, not initial phase difference between the magnetic sensors 3A and 3B. Other structural features are similar to those employed in the constructional example shown in and described with reference to FIG. 8.

According to this example, it is possible to cause the values of the initial phase difference $\Phi 1$ and $\Phi 2$ to be stored in the respective storage units 8A and 8B and also to set those values freely when required. By way of example, the use is made of a reset mode setting unit 19 separately as shown therein and when a reset request is made from, for example, the communication interface 9, a command of $\Phi 1=\Phi 2=0$ can be set in each of the storage units 8A and 8B. In such case, since the phase signals from the associated magnetic sensors 3A and 3B can be matched with the same value, it is possible to set the phase signals so as to occupy the zero value freely at an arbitrarily chosen rotational position of the rotatable member 4 (FIG. 1). As a result, it become possible to store the arbitrarily chosen rotational position as a reference position and, after completion of fitting of the rotation detecting device 1, alignment in position with the machine such as, for example, a bearing assembly, on which this rotation detecting device is fitted, can be accomplished simply.

Also, in this rotation detection device 1, the magnetic sensors 3A and 3B and a signal processing circuit including the angle information output circuit 10 shown in FIG. 8 or 9 may be integrated in a sensor module 11 such as shown in the example of FIG. 2. This sensor module 11 may be integrated on a single semiconductor chip. Where they are so designed as described above, such advantages as, for example, reduction in the number of component parts used, increase of the positional accuracy of the magnetic sensors 3A and 3B relative to each other, reduction of the manufacturing cost, reduction of the assembling cost and increase of the detecting accuracy resulting from reduction of the signal noises can be obtained and the rotation detection device 1 can be designed to be compact in size and low in cost.

It is to be noted that in such case, since the single sensor module 11 is so arranged as to confront the two magnetic encoders 2A and 2B, those two magnetic encoders 2A and 2B are naturally arranged in close proximity to each other.

As hereinabove described, the rotation detection device 1 includes the plurality of the magnetic encoders 2A and 2B provided in the form of rings coaxial to one another and having the respective numbers of the magnetic poles different from each other, the plural magnetic sensors 3A and 3B for detecting the magnetic fields emanating respectively from the magnetic encoders 2A and 2B and each having the function of detecting information on a position within one of the magnetic poles of the associated magnetic encoder 2A and 2B, in which the phase difference between the magnetic field signals detected by the respective magnetic sensors 3A and 3B is determined by the phase difference detector 6 and, based on the detected phase difference, the absolute angle of the magnetic encoders 2A and 2B is calculated by the angle calculator 7, and in which the initial phase difference occurring in the detected magnetic field signals of the magnetic sensors 3A and 3B due to the positions, at which the magnetic encoders 2A and 2B are fitted, is corrected by the corrector 12 (12A, 12B). Accordingly, the structure can become simple and the absolute angle can be detected with high precisions without being affected by the position at which the magnetic encoders 2A and 2B are fitted.

Although in the embodiment hereinabove described, reference has been made to the use of the two magnetic encoders 2A and 2B, the number of the magnetic encoders used may not be limited to two such as shown and described and three or more magnetic encoders having the respective number of the magnetic pairs different from each other may be combined so that the absolute angle can be detected in a wide range. Where this rotation detection device 1 is used for the detection of the rotation of the motor, by employing, in adjusting the difference in number of the magnetic pairs referred to above, such a combination as P and P+Pn in consideration of the number Pn of rotor poles of the motor, the electrical angle of the motor can be detected by the rotation detection device 1 and, therefore, it is convenient to the control of rotation of the motor.

Figure 11:
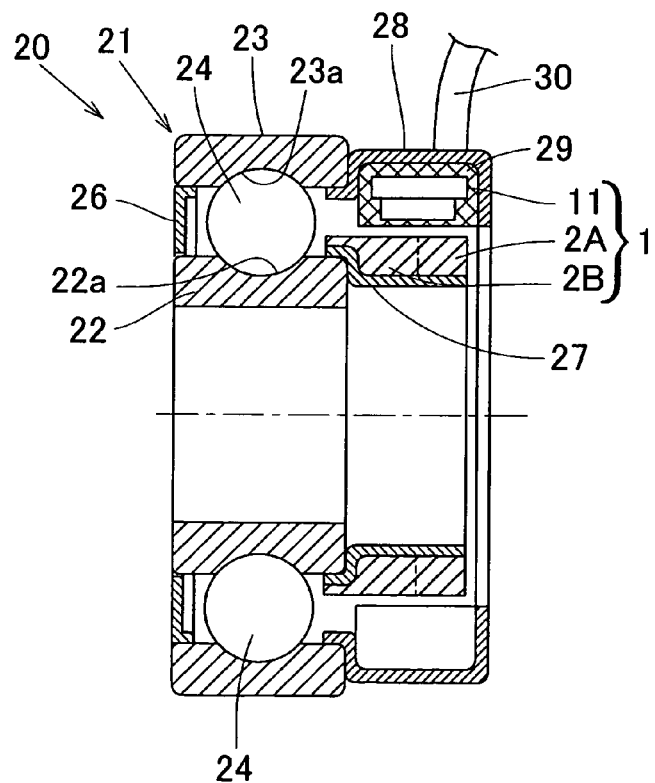
FIG. 11 is a sectional view showing a second preferred embodiment of a rotation detector equipped bearing assembly having this rotation detecting device mounted on a bearing unit.

FIG. 11 illustrates a sectional view showing one preferred embodiment of a rotation detector equipped bearing assembly having the above described rotation detecting device 1 mounted on a bearing unit. This rotation detector equipped wheel support bearing assembly 20 is provided with the rotation detection device 1 mounted on one end of a rolling bearing unit 21 having a plurality of rolling elements 24 interposed between an inner ring 22, which is a rotating ring, and an outer ring 23 which is a stationary ring. The rolling bearing unit 21 is in the form of a deep groove ball bearing and rolling surfaces 22a and 23a for the rolling elements 24 are defined, respectively, in an outer diametric surface of the inner ring 22 and an inner diametric surface of the outer ring 23. A bearing space delimited between the inner ring 22 and the outer ring 23 has ends opposite to each other, and one of the ends of the bearing space remote from the end where the rotation detection device 1 is installed, is sealed by a sealing element 26.

The two magnetic encoders 2A and 2B of the rotation detection device 1 are juxtaposed relative to each other in the axial direction on an outer diametric surface of a ring shaped core metal 27 that is mounted under press fit in an outer diametric surface of one end of the inner ring 22. The two magnetic sensors 3A and 3B of the rotation detection device 1 are integrated into a sensor module 11 together with the signal processing circuit shown in and described with particular reference to FIG. 2 and are covered by a resin molding 29 while the module 11 is inserted inside a ring shaped metallic sensor housing 28, which is in turn fitted to an inner diametric surface of one end of the outer ring 23. In this way, the magnetic encoders 2A and 2B and the associated magnetic sensors 3A and 3B are arranged and opposed to each other in the radial direction. A lead line 30 connected to the sensor module 11 is drawn outwardly through the sensor housing 28 and, through this lead line, transmission of signals and an electric power supply take place between the sensor module 11 and an external circuit.

Since in this rotation detector equipped bearing assembly the rotation detection device 1 is mounted on the rolling bearing assembly 21, reduction in number of component parts used in a bearing utilizing machine or equipment, reduction in number of assembling steps and compactization can be achieved while it is equipped with a function of detecting the absolute angle.

Figure 12:
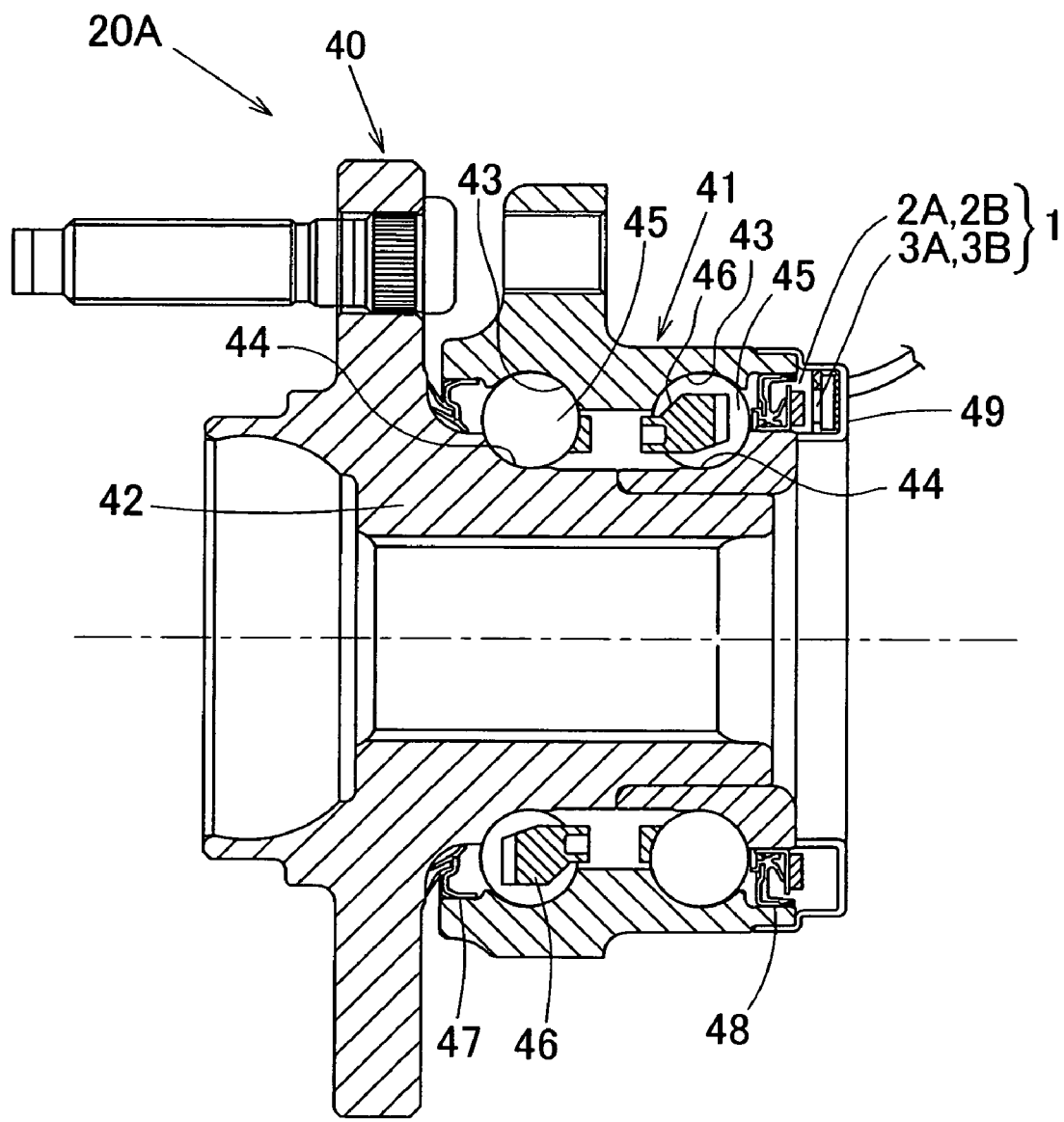
FIG. 12 is a sectional view showing a third preferred embodiment of a rotation detector equipped bearing assembly having this rotation detecting device mounted on the bearing unit.

FIG. 12 illustrates another constructional example of the rotation detector equipped bearing assembly having the above described rotation detecting device 1 mounted on the bearing unit. This rotation detector equipped bearing assembly 20A is an inner ring rotating model of a third generation type, in which the rotation detecting device 1 of an axial type is mounted on a wheel support bearing assembly 40 for the support of a vehicle drive wheel.

The wheel support bearing assembly 40 includes an outer member 41 having double row rolling surfaces 43 formed in an inner periphery thereof, an inner member 42 having rolling surfaces 44 formed in face-to-face relation with the rolling surfaces 43, and double row rolling elements 45 interposed between the rolling surfaces 43 and 44 defined respectively in the outer and inner members 41 and 42 and is used for rotatably supporting a vehicle wheel relative to a automotive vehicle body structure. This wheel support bearing assembly 40 is rendered to be a dual row, outwardly oriented angular contact ball bearing type, in which the rolling elements 45 are employed in the form of balls and are retained by a retainer 46 employed for each row. A bearing space delimited between the outer member 41 and the inner member 42 has opposite ends sealed by sealing elements 47 and 48. A slinger of the sealing element 48 at an inboard end, which is press fitted onto an outer peripheral surface of the inner member 42, is rendered to be the magnetic encoders 2A and 2B of the rotation detecting device 1. That is to say, the magnetic encoders 2A and 2B in such case are of an axial type shown in and described with particular reference to FIG. 2, and the magnetic pole pairs of those magnetic encoders 2A and 2B are arranged circumferentially and the associated magnetic sensors 3A and 3B of the rotation detecting device 1 are disposed in axially face-to-face relation with the magnetic encoders 2A and 2B. The magnetic sensors 3A and 3B are resin molded within a ring shaped metallic casing 49 and fixed to the outer member 41 through this metallic casing 49.

According to this rotation detector equipped bearing assembly 20A, the rotation of the vehicle wheel can be detected as the absolute angle with high precision.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A rotation detecting device comprising:
a plurality of magnetic encoders of a ring shape arranged coaxially and having different numbers of magnetic poles;
a plurality of magnetic sensors each operable to detect the magnetic field of the corresponding magnetic encoder and having a function of detecting positional information within a single magnetic pole of the corresponding magnetic encoder;
a phase difference detector to determine the phase difference of magnetic field signals detected respectively by the magnetic sensors;
an angle calculator to calculate an absolute rotation angle of the magnetic encoders based on the detected phase difference; and
a correcting unit to correct an initial phase difference occurring in the magnetic field signals, detected respectively by the magnetic sensors, due to positions at which the magnetic encoders are fitted,
wherein each of the magnetic sensors comprises a line sensor, in which sensor elements are lined up in a direction conforming to the direction, in which the magnetic poles of the corresponding magnetic encoder are arranged and is operable to generate two phase signal outputs descriptive of sine and cosine curves by means of calculation to thereby detect the position within the magnetic poles by interpolation of the two phase signal outputs.

2. The rotation detecting device as claimed in claim 1, wherein the correcting unit comprises one correcting unit to correct the initial phase difference of the magnetic field signal detected by one of the magnetic sensors.

3. The rotation detecting device as claimed in claim 1, wherein the correcting unit comprises a plurality of correcting units to correcting the initial phase differences of the magnetic field signals detected respectively by the magnetic sensors.

4. The rotation detecting device as claimed in claim 1, further comprising a storage unit to store a predetermined value of an initial phase difference which value is arbitrarily adjustable from outside,
wherein the correcting unit is supplied with the predetermined value.

5. The rotation detecting device as claimed in claim 1, further comprising an angle information output circuit operable on a basis of a detection signal from one of the magnetic sensors to output the absolute angle, calculated by the angle calculator, in the form of an ABZ phase signal comprised of two, A phase and B phase pulse signals which are displaced 90° in phase relative to each other and a Z phase pulse signal indicative of a position of origin.

6. The rotation detecting device as claimed in claim 1, further comprising an angle information output circuit for outputting the absolute angle calculated by the angle calculator and wherein the magnetic sensors, the phase difference detector, the angle calculator and the angle information output circuit are integrated together into a sensor module.

7. The rotation detecting device as claimed in claim 6, wherein the module is integrated on a semiconductor chip.

8. A rotation detecting device equipped bearing assembly with a rotation detection device, in which the rotation detecting device as described in claim 1 is mounted on a bearing thereof.

9. The rotation detecting device equipped bearing assembly as claimed in claim 8, wherein the bearing assembly is a wheel support bearing assembly.

* * * * *

UNITED STATES PATENT AND TRADEMARK OFFICE
CERTIFICATE OF CORRECTION

PATENT NO. : 8,319,493 B2  
APPLICATION NO. : 12/733890  
DATED : November 27, 2012  
INVENTOR(S) : Toru Takahashi et al.

Page 1 of 1

It is certified that error appears in the above-identified patent and that said Letters Patent is hereby corrected as shown below:

On the Title page, Item (56) (U.S. Patent Documents); Line 6, Delete "1/2003" and insert -- 9/2003 --, therefor.

Signed and Sealed this  
Second Day of April, 2013

Teresa Stanek Rea  
*Acting Director of the United States Patent and Trademark Office*